United States Patent [19]
Genger

[11] 3,750,995
[45] Aug. 7, 1973

[54] MOUNTING DEVICE FOR PROJECTION SCREEN
[75] Inventor: Horst Genger, Medinah, Ill.
[73] Assignee: Knox Manufacturing Company, Wood Dale, Ill.
[22] Filed: Feb. 24, 1972
[21] Appl. No.: 229,131

[52] U.S. Cl. .............................. 248/324, 160/23
[51] Int. Cl. ............................................ G03b 21/56
[58] Field of Search............... 248/324, 325, 326, 248/278, 279, 280, 284, 287, 291, 292, 293; 160/24, 368, 23, 26; 287/14

[56] References Cited
UNITED STATES PATENTS
| 3,362,671 | 1/1968 | Johnson | 248/324 |
| 3,304,107 | 2/1967 | Bahmuller | 287/14 X |
| 3,144,899 | 8/1964 | Stewart et al. | 160/24 |
| 3,567,168 | 3/1971 | Jennings | 248/284 |

FOREIGN PATENTS OR APPLICATIONS
378,106   7/1964   Switzerland.......................... 287/14

Primary Examiner—J. Franklin Foss
Attorney—Hofgren, Wegner, Allen, Stellman & McCord

[57] ABSTRACT

A mounting device for supporting a projection screen in angularly adjusted positions inclined from vertical including a first bracket adapted to be secured to an overhead support, a second bracket adapted to be secured to a casing for a projection screen, means pivotally mounting the second bracket for adjustment on the first bracket, cooperating detent means on the two brackets for positively holding the second bracket in adjusted positions, and release means responsive to angular movement of the second bracket on the first bracket for disengaging the detent means for return of the second bracket to vertical position.

9 Claims, 7 Drawing Figures

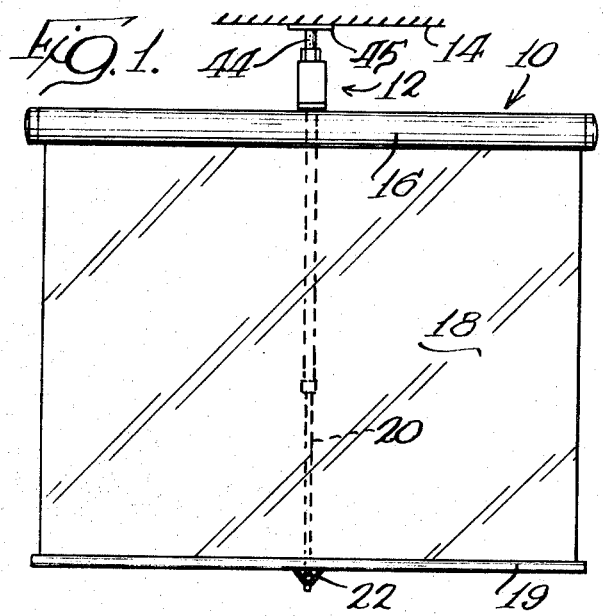
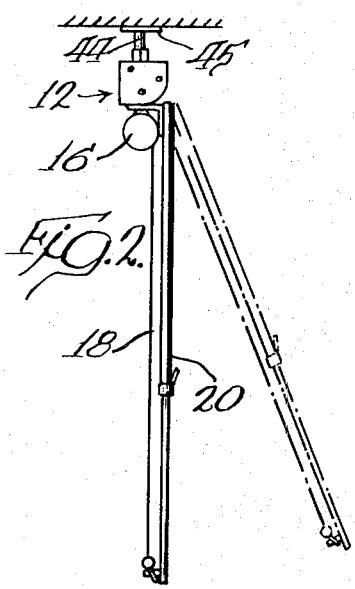
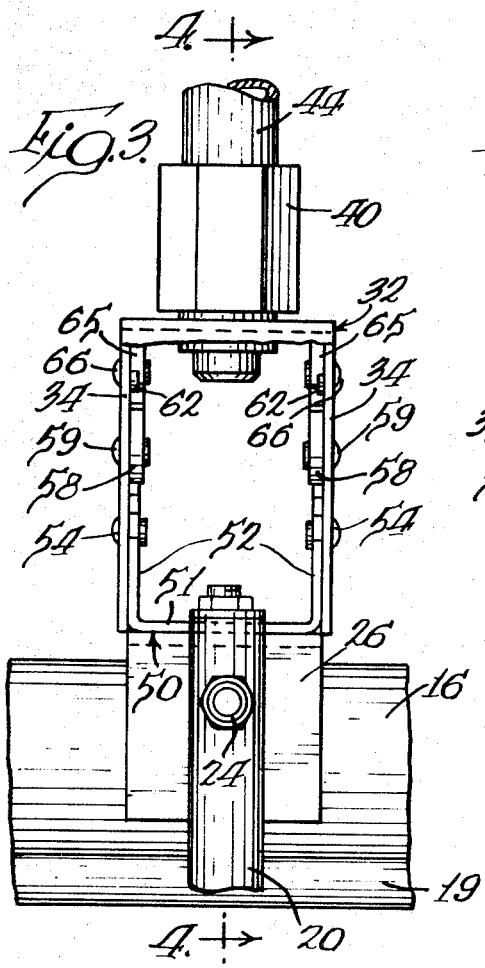
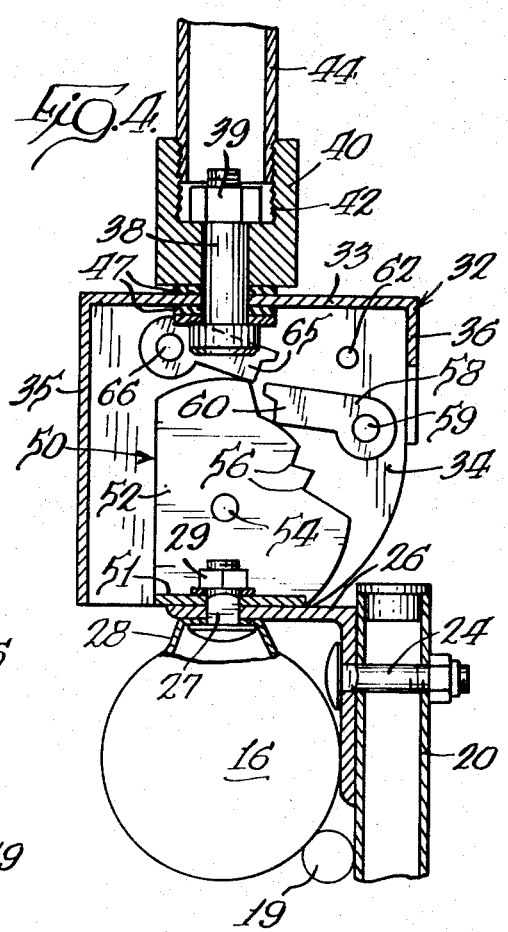

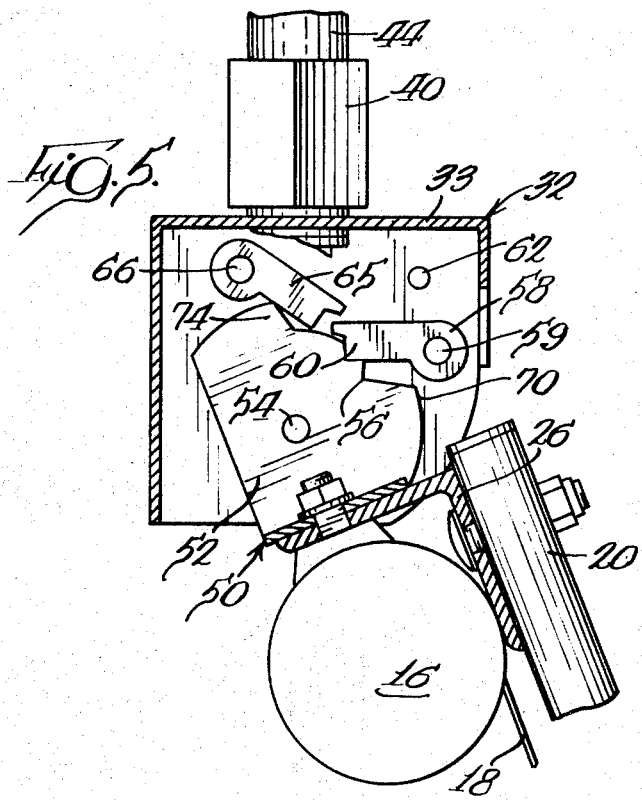
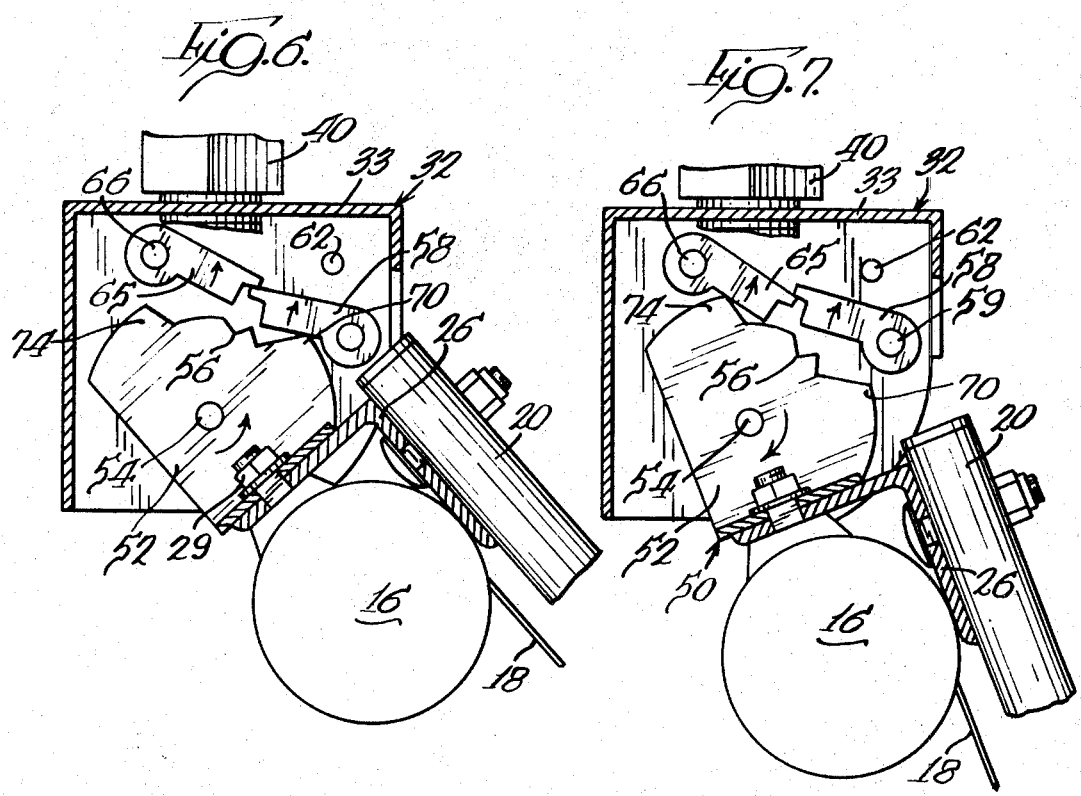

MOUNTING DEVICE FOR PROJECTION SCREEN

BACKGROUND OF THE INVENTION

The present invention relates to a mounting device for hanging a projection screen from an overhead support in a manner to permit angular adjustment of the screen to avoid dimensional distortion in the image, sometimes called "keystoning," when the projection screen is not perpendicular to the axis of the projected light.

In the past, there has been recognition of the problem of "keystoning" and other distortion in the dimensions of a projected image when the plane of the viewing screen is not perpendicular to the axis of the projected image. For example, U. S. Pat. No. 3,362,671 relates to an overhead suspension assembly for supporting a viewing screen in angularly adjusted positions inclined from the vertical. More particularly, a screen support is pivotally mounted on an overhead clamp clevis, and the clamp is adapted to be appropriately tightened to retain the screen support in angularly adjusted positions where the screen may be disposed perpendicular to the projected image. In such arrangement, the adjustment for the clamp is disposed at an elevated position near the ceiling, and is not readily accessible for release during periods of adjustment. As a result, efforts are made to swing the screen without releasing the clamp. Under these circumstances, the relatively long lever arm from the ceiling to the bottom of the screen contributes toward application of relatively great forces at the place where the suspension assembly is secured to the ceiling, and there is a substantial force tending to tear the suspension assembly away from the ceiling. If the clamp is loosened sufficiently to facilitate easy pivotal movement, then the screen will not stay in angularly inclined positions but tends to swing to the vertical. Thus, there is a need for an overhead mounting device for a projection screen wherein angular adjustment may be made freely and the screen is positively retained in angularly adjusted positions.

U. S. Pat. No. 523,482 relates to an incandescent lamp holder including a lamp support which is pivotally movable on an overhead bracket and spring-biased upwardly to engage ratchet teeth on the overhead bracket when the spring is released, but such a compressible spring is not suitable for supporting a relatively heavy projection screen assembly.

German Pat. No. 339,415 shows an overhead lamp suspension apparatus including a lower arm swivelly mounted on an upper support bracket, together with a spring-biased detent plunger on the lower arm adapted to engage apertures in the overhead support, but such an arrangement requires an operating connection from the remotely situated detent plunger to a manually accessible position convenient to reach.

In the copending application of Bieschke, Ser. No. 229,130, filed concurrently herewith Feb. 24, 1972, the invention relates to a mounting device for a projection screen which includes provision for positively holding the projection screen in adjusted positions and also provision for free pivotal movement from one position to another. However, the Bieschke device requires that the weight of the projection screen be manually elevated to disengage the detent means and permit pivotal movement, and the lifting of the screen may be inconvenient for some people.

SUMMARY OF THE PRESENT INVENTION

The present invention includes provision for positively holding a projection screen in angularly adjusted positions inclined from vertical and also permits free pivotal movement of the projection screen from one position to another without the necessity of having to lift the weight of the projection screen during adjustment.

More particularly, a mounting device according to the present invention includes one bracket adapted to be secured to an overhead support, a second bracket pivotally mounted on the first bracket and adapted to be secured to a support for a projection screen, cooperating detent means on the two brackets for holding the second bracket in adjusted positions, and release means which is very simply actuated by angular movement of the second bracket to disengage the detent means and permit free pivotal return movement of the second bracket to vertical position.

As illustrated herein, the detent means includes detent teeth on one bracket and a pivotally mounted detent pawl on the other bracket engageable with the detent teeth.

Preferably, the detent teeth are provided on the second bracket and the detent pawl is pivotally mounted on the first bracket and gravity urged toward the detent teeth.

In the preferred embodiment illustrated, the release means includes a release pawl pivotally mounted on one bracket and engageable with the detent means to disengage the detent means responsive to angular movement of the second bracket to a predetermined inclincation from vertical.

As shown herein, the release pawl is pivotally mounted on the first bracket and engageable with the detent pawl to disengage the latter, and the second bracket includes a first cam engageable with the detent pawl on movement of the second bracket to a predetermined inclination to latch the detent pawl behind the release pawl, and a second cam engageable with the release pawl on return of the second bracket toward vertical to hold the detent pawl out of contact with the detent teeth.

BRIEF DESCRIPTION OF THE DRAWINGS

FIG. 1 is a front elevational view of a projection screen supported by a mounting device embodying the principles of the present invention;

FIG. 2 is a side elevational view of the screen and mounting device illustrated in FIG. 1;

FIG. 3 is an enlarged fragmentary front elevational view of the mounting device illustrated in FIG. 1 with part of the upper bracket broken away;

FIG. 4 is a vertical sectional view through the mounting device, taken at about the line 4—4 of FIG. 3 with the screen disposed in vertical position;

FIG. 5 is a sectional view similar to FIG. 4 with the screen detented in an angularly adjusted position inclined from vertical;

FIG. 6 is a sectional view similar to FIG. 5 but with the screen adjusted toward a position for latching the detent pawl behind the release pawl: and FIG. 7 is a sectional view similar to FIG. 6, but with the screen positioned where the release pawl is about to be disengaged from the detent pawl on return of the screen toward the vertical position.

DETAILED DESCRIPTION OF PREFERRED EMBODIMENT

Referring to the drawings in more detail, FIG. 1 illustrates a projection screen assembly 10 supported by a mounting device 12 embodying the principles of the present invention, in turn supported on a ceiling 14.

The screen assembly 10 may be along the lines of that shown and described in U. S. Pat. No. 3,191,663, and need not be described in complete detail herein. In brief, it includes a casing 16 of tubular configuration adapted for storing a screen 18 in rolled condition. The lower end of the screen is provided with a reinforcing rod 19. In order to hold the screen 18 in the extended condition illustrated where it provides a panel surface for a projected image, the screen assembly includes a standard 20 extending from the casing to the lower end of the screen, and the latter includes a suitable attachment 22 for securing the extended screen to the standard against the tension of a rewind spring. If desired, the standard may be pivotally mounted by means of a bolt 24 and telescopically extensible as described in U. S. Pat. No. 3,191,663, in order to provide for compact storage. As illustrated, the bolt 24 is mounted in an angle bracket 26 in turn secured to the casing 16. As shown in FIG. 4, for example, the bracket 26 is attached to the casing 16 by means of a bolt 27 which is seated in a boss 28 in the casing and secured by nut 29.

The mounting device 12 includes an upper bracket 32 adapted to be attached to an overhead support. As illustrated herein, the bracket 32 includes a top panel or crosspiece 33, depending side walls or legs 34, a front wall 35 and a partial rear wall 36. The upper wall 33 is apertured to receive a mounting bolt 38 which is secured by a nut 39 in an enlarged collar 40. The collar 40 is formed with a threaded recess 42 for receiving the threaded lower end of a suspension rod 44. The rod 44 is provided at the upper end with an enlarged annular flange 45 adapted to be secured to the ceiling by screws or bolts. Preferably, the bracket 32 is mounted for pivotal adjustment about the vertical axis of the mounting bolt 38, and to facilitate movement, antifriction washers may be utilized as at 47 on opposite surfaces of the crosspiece 33.

In order to pivotally mount the projection screen for adjustment to positions angularly inclined from vertical, a second lower bracket 50 is pivotally mounted on the upper bracket 32. The lower bracket comprises an upright U-shaped member having a crosspiece 51, and upright legs 52. The crosspiece 51 is secured to a screen assembly 10 to support the latter by means of the bolt 27 which passes through an aperture in the crosspiece 51.

The upright spaced parallel legs 52 of the second bracket are disposed between the side legs or panels 34 of the upper bracket and closely adjacent thereto. The legs 52 are pivotally mounted respectively on the legs 34 by rivets or the like as at 54.

In order to releasably positively hold the lower bracket 50 and the projection screen in angularly adjusted positions, cooperating detent means on the two brackets includes detent teeth or detent recesses as at 56 formed in the rear edge of each of the upright legs 52 on the lower pivotally mounted bracket 50. The detent teeth on the bracket 50 cooperate with a detent pawl 58 pivotally mounted at 59 on side wall 34 of the upper bracket 32. The pawl 58 is mounted in a manner such that gravity tends to urge the free end of the pawl at 60 into the detent recesses 56. Thus, when the bracket 50 is pivoted from the vertical position in FIG. 4 to the angularly disposed position of FIG. 5, the pawl end 60 falls into one of the detent recesses 56 so that the bracket 50 is prevented from returning to the vertical position. On viewing FIG. 5, it will be understood that the bracket 50 may be angularly adjusted further in a counterclockwise direction to allow the pawl end 60 to engage the second detent recess, but when the pawl is in either recess, clockwise return motion of the pivoted bracket is prevented. In order to prevent retraction of the detent pawl 58 to an over-center position where it would not fall by gravity toward the detent position, a stop may be provided as at 62 on the side wall 34 in a position to limit clockwise pivotal movement of pawl 58.

In order to provide for return of the lower bracket 50 and the screen assembly to vertical position, a release pawl 65 is pivotally mounted at 66 on the side wall 34 of the upper bracket adjacent to the detent pawl 58. The two pawls extend toward each other and are adapted to engage each other when the two are approximately aligned, so that the tip of the release pawl 65 is adapted to lift the tip of the detent pawl 60 to hold the detent pawl disengaged from the detent teeth during return of the screen toward vertical. The detent pawl 58 is initially disengaged from the detent teeth 56 by counterclockwise angular motion of the lower bracket 50 to a position illustrated in FIG. 6 where a cam projection 70 on the side wall 52 engages the detent pawl to lift it from the detent recesses 56. On viewing FIG. 6, it will be understood that slight additional counterclockwise movement of the cam projection 70 lifts the tip of the detent pawl 58 past the tip of the release pawl 65 so that the detent pawl is latched behind the release pawl as shown in FIG. 7. Now, as the screen assembly and lower bracket are returned in a clockwise direction toward vertical position, the release pawl 65 holds the detent pawl 58 disengaged from the detent recesses 56.

In order to release the detent pawl from the release pawl, the side wall 52 of the lower bracket includes a cam portion 74 adapted to engage the release pawl 65 as the screen assembly and lower bracket approach the vertical position. On viewing FIG. 7, it will be understood that additional clockwise movement of the cam portion 74 will lift the release pawl past the detent pawl so that the parts return to the position illustrated in FIG. 4.

In operation, the mounting device of the present invention positively holds the projection screen in angularly inclined positions to compensate for "keystoning" by interaction of the detent pawl 58 and the detent recesses 56. Yet, the screen assembly and the lower bracket are freely movable without significant resistance when it is desired to adjust the screen from the vertical position to either of the angularly inclined positions, and when it is desired to return the screen from the angularly inclined positions to the vertical position. The detent means and release means are very simply operated responsive to angular movement of the lower bracket, without the need for complex operating mechanism extended to a manually accessible position.

I claim:

1. A mounting device for hanging a viewing screen in angularly adjusted positions, comprising, a. a first bracket adapted to be secured to an elevated support,
b. a second bracket adapted to be secured to a support for a viewing screen,
c. means mounting the second bracket on the first bracket for pivotal movement about a horizontal axis,
d. detent means including detent teeth on one bracket and a pivotally mounted detent pawl on the other bracket normally urged into contact with the teeth to hold the second bracket in angularly adjusted positions inclined from the vertical, and
e. release means including a release pawl pivotally mounted on said other bracket and engageable with the detent pawl to disengage the latter responsive to angular movement of the second bracket beyond a predetermined inclination from vertical.

2. A mounting device as defined in claim 1, wherein the detent means includes
   detent teeth on the second bracket and a detent pawl on the first bracket gravity-biased toward the detent teeth.

3. A mounting device as defined in claim 1, wherein the release means includes
   a release pawl pivotally mounted on the first bracket, and
   cam means on the second bracket engageable with the detent pawl and the release pawl to disengage the detent pawl from the detent teeth during return of the second bracket toward vertical.

4. A mouting device as defined in claim 3, wherein the cam means on the second bracket comprises
   a first cam engageable with the detent pawl on movement of the second bracket to a predetermined angle of inclination to latch the detent pawl behind the release pawl, and
   a second cam engageable with the relase pawl on return of the second bracket toward vertical to hold the detent pawl out of contact with the detent teeth.

5. A mounting device as defined in claim 4, wherein the second cam includes
   a portion effective to disengage the release pawl from the detent pawl when the second bracket is vertically disposed.

6. A ceiling mount for hanging a projection screen in angularly adjusted positions, comprising,
   a. a first bracket adapted to be secured to an overhead support and having spaced parallel depending legs,
   b. a second bracket adapted to be secured to a casing for a projection screen and having spaced parallel upright legs adjacent the depending legs of the first bracket,
   c. horizontally disposed pivot pins mounted in the legs of the first bracket and passing through apertures in the legs of the second bracket for mounting the second bracket for pivotal movement,
   d. detent means including detent teeth on the second bracket and a pivoted detent pawl on the first bracket biased toward the detent teeth to hold the second bracket in angularly adjusted positions, and
   e. release means including a release pawl pivotally mounted on the first bracket and cam means on the second bracket engageable with the detent pawl and the release pawl to disengage the detent pawl from the detent teeth during return of the second bracket toward vertical.

7. A ceiling mount as defined in claim 6., wherein the cam means on the second bracket comprises
   a first cam engageable with the detent pawl on movement of the second bracket to a predetermined angle of inclination to latch the detent pawl behind the release pawl, and
   a second cam engageable with the release pawl on return of the second bracket toward vertical to hold the detent pawl out of contact with the detent teeth.

8. A ceiling mount for hanging a projection screen in angularly adjusted positions, comprising,
   a. a first bracket having an upper crosspiece adapted to be secured to a ceiling support and depending legs at opposite sides of the crosspiece,
   b. a second bracket having a lower crosspiece adapted to be secured to a casing for a rollable projection screen and upright legs at opposite sides of the crosspiece positioned between the depending legs of the first bracket,
   c. a horizontally disposed pivot pin mounted on each leg of the first bracket,
   d. an aperture in each leg of the second bracket receiving one pivot pin and mounting the second bracket for pivotal movement,
   e. detent teeth on at least one leg of the second bracket,
   f. a detent pawl pivoted on the adjacent leg of the first bracket and gravity-biased toward contact with the detent teeth to hold the second bracket in angularly adjusted positions inclined from vertical,
   g. a release pawl pivoted on the adjacent leg of the first bracket and gravity-biased toward the detent pawl,
   h. a first cam on said one leg of the second bracket engageable with the detent pawl on movement of the second bracket to a predetermined inclination to latch the detent pawl behind the release pawl, and
   i. a second cam engageable with the release pawl on return of the second bracket toward vertical to hold the detent pawl out of contact with the detent teeth.

9. A ceiling mount as defined in claim 8., wherein the second cam includes
   a portion effective to disengage the release pawl from the detent pawl when the second bracket is vertically disposed.

* * * * *